T. KREIPE.
APPARATUS FOR REMOVING SEED, &c., FROM FLAX PLANTS AND THE LIKE.
APPLICATION FILED MAY 27, 1915.
1,170,646. Patented Feb. 8, 1916.
2 SHEETS—SHEET 1.
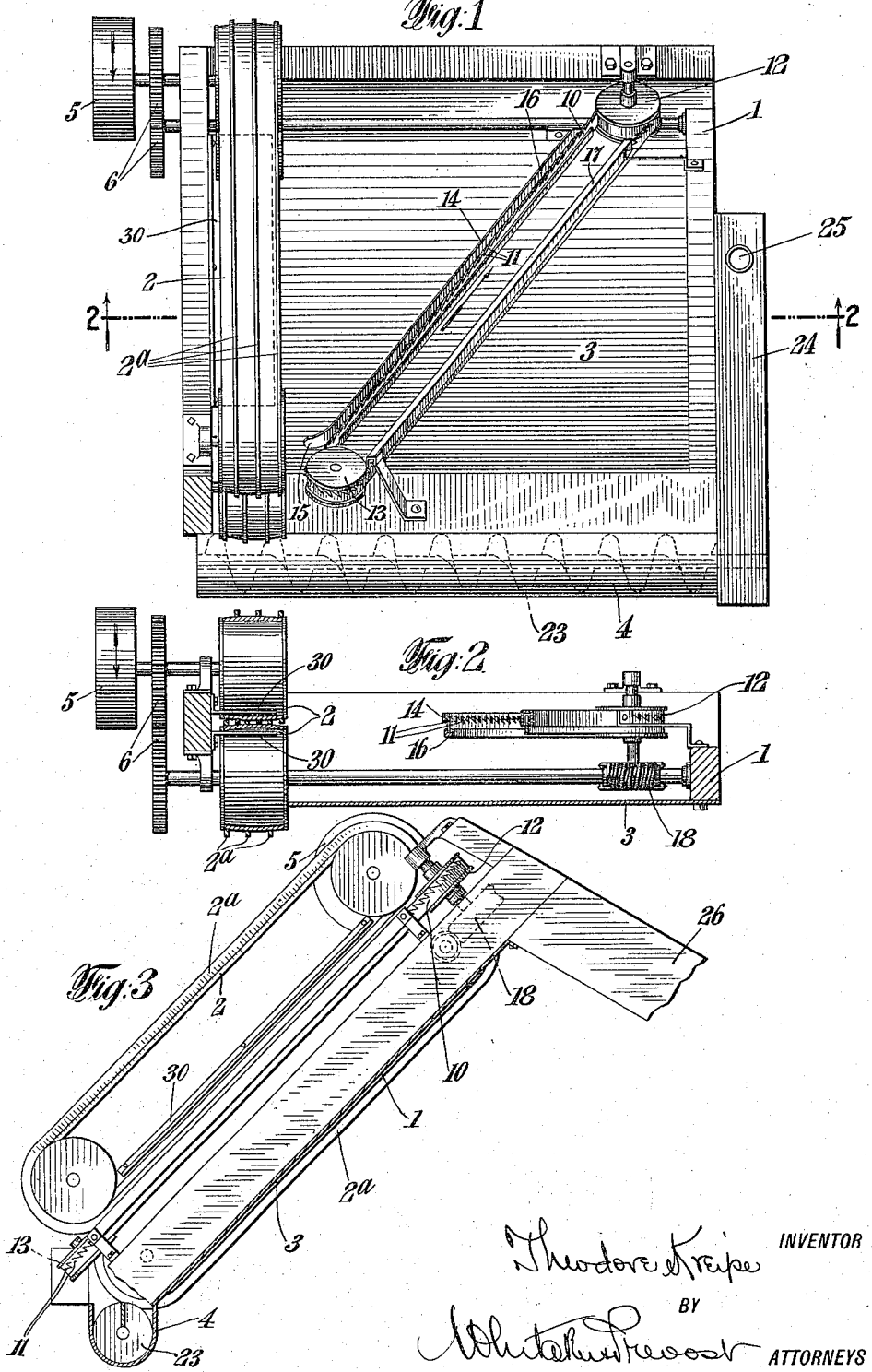
INVENTOR
Theodore Kreipe
BY
Whitaker Prevost
ATTORNEYS

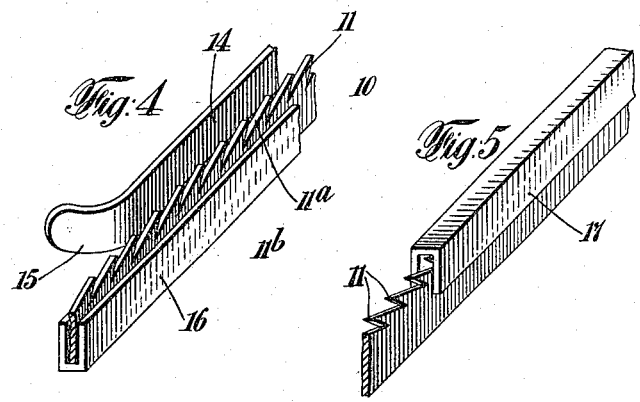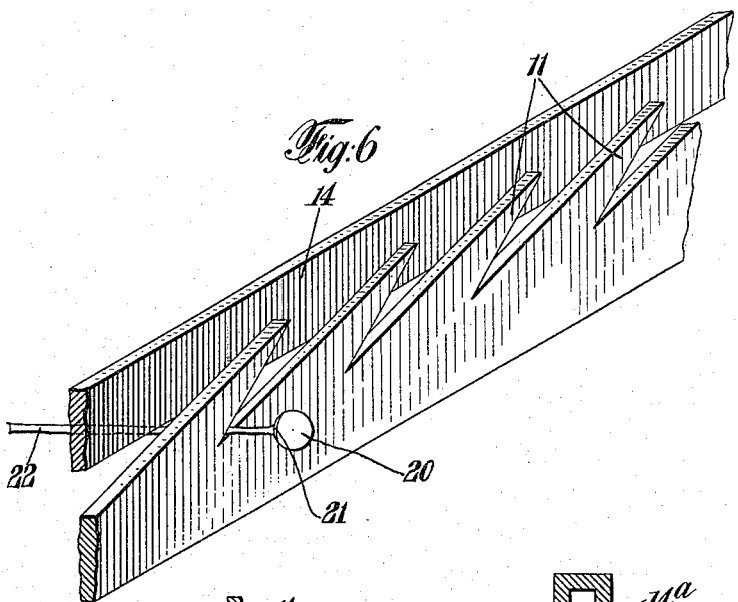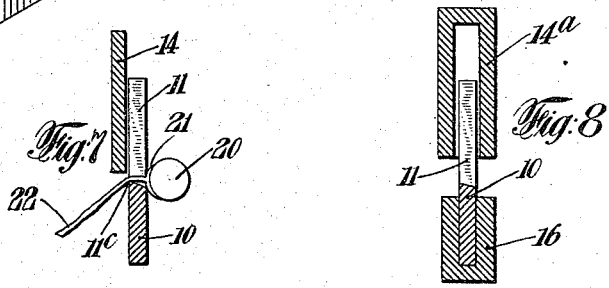

UNITED STATES PATENT OFFICE.

THEODORE KREIPE, OF FLORAL PARK, NEW YORK, ASSIGNOR TO VICTOR E. FREEMAN AND LOUIS P. WHITAKER, BOTH OF NEW YORK, N. Y.

APPARATUS FOR REMOVING SEED, &c., FROM FLAX-PLANTS AND THE LIKE.

1,170,646.

Specification of Letters Patent.

Patented Feb. 8, 1916.

Application filed May 27, 1915. Serial No. 30,732.

*To all whom it may concern:*

Be it known that I, THEODORE KREIPE, a citizen of the United States, residing at Floral Park, Long Island, in the county of Nassau and State of New York, have invented certain new and useful Improvements in Apparatus for Removing Seed, &c., from Flax-Plants and the like; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one embodiment of my invention selected by me for purposes of illustration, and the said invention is fully disclosed in the following description and claims.

Referring to the said drawings, Figure 1 represents a front elevation of an embodiment of my invention selected by me for purposes of illustration and adapted for attachment upon a flax pulling and binding machine. Fig. 2 represents a transverse section on line 2—2 of Fig. 1. Fig. 3 is an end elevation of the apparatus shown in Fig. 1. Figs. 4, 5, 6 and 7 are details of parts of the mechanism. Fig. 8 is a transverse sectional view of a modification.

Where flax is harvested for the purpose of subsequent treatment to recover the fiber of the flax plant for use in the linen industry and for other purposes, it is necessary to remove from the plant the seed and seed pods. This is not only a matter of economy as the seed may be saved and used for the production of linseed oil, and for other purposes, but the base of the seed cup constitutes a small button or enlargement which is intimately associated with the fiber of the plant and forms, in effect, the terminal thereof. These tough "buttons," as I term them for purposes of identification, are extremely difficult to disassociate from the fiber, and if they are left on the plant, they will remain attached to the fiber through all the processes of the treatment to recover the fiber as well as the subsequent processes of carding, spinning, etc., producing lumps analogous to knots in the fiber and in the thread or fabrics in which the fiber is used. It is extremely desirable, therefore, to not only remove the seed and seed pods, but to remove these terminal buttons from the plant.

My present invention has for its object mechanism for accomplishing this desirable result on a commercial scale, and in accordance with my invention, I grip the flax plants adjacent to their butt or root ends in a gripping conveyer and bring the stalk portions into serrations formed in a stripping device which is disposed angularly to the gripping conveyer so that its line of travel diverges more or less rapidly from that of the conveyer, and I also provide means for retaining the stem portions in the serrations of the stripping device until they are pulled longitudinally out of engagement therewith and are deprived of the seed pods, seeds, and also the terminal buttons. The stripping device is so constructed and arranged and it moves at such a speed that an angular strain is brought upon the stalks or branches of the plant a little distance below the seed pods as well as at the base of the seed pods, so as to break off the branches or stalks, as far as possible, a short distance below the base of the seed pod to insure the removal of the terminal button, as it is practically impossible to detach the terminal button itself from the end of the fiber, while it is easier to break the fiber at a little distance from the bottom.

The apparatus shown and described herein may be employed for the treatment of flax after it is gathered and brought in from the field, whether it is cut or otherwise removed from the ground, but obviously additional handling of the flax is avoided if the device is located upon a flax harvesting machine so that the flax, after being severed from the ground, can be passed through the stripping mechanism on its way to the binding mechanism, and in the accompanying drawings I have shown my invention embodied in an apparatus which may form part of such a flax harvesting machine, for example, as is illustrated in the application of N. E. Funk and L. P. Whitaker, for United States Letters Patent filed April 3, 1914, and given Serial No. 829,213.

In the said drawings, 1 represents the frame of the stripping mechanism, which, in this instance, is disposed in an inclined position between the grain platform and the binding mechanism of a harvesting machine of the kind illustrated in the application above referred to. At one end of the frame I provide a gripping conveyer which comprises, in this instance, a pair of endless belts 2—2, each mounted upon a supporting roller at opposite ends of the frame, and the opposed parallel portions of said belts 2—2 being substantially in line with a seed platform 3 which will be held in inclined position by the inclined frame 1 to receive the seed and convey it to a trough 4 at the bottom of said frame. The belts 2—2 are each provided with continuous longitudinally disposed and transversely separated projecting ribs $2^a$, the ribs of one belt intermeshing with those of the other, so as to deflect the stalks out of a straight line, as shown in Fig. 2, and effectually prevent the longitudinal movement of the stalks with respect to the conveyer without injury to the stalks, by imparting to them, a plurality of bends. The specific form of this gripping conveyer forms no part of my present invention and any other form of gripping conveyer which will grip the stalks and prevent them from being pulled out longitudinally, may be substituted therefor. The rollers supporting the endless belts 2—2, at their upper ends, are provided with any suitable form of driving mechanism, as for example, the wheel 5 on the shaft of one of said rollers, and the intermeshing gears 6—6 connecting the shafts with the rollers for joint movement in opposite directions, and the parallel portions of the belts may be held in operative relation by guides 30, as shown, or by other suitable means.

10 represents my improved stripping device which in the embodiment of the invention selected for illustration and shown in the drawings, consists of an endless metallic band provided with a plurality of teeth 11 provided with recesses between them. This band is disposed substantially perpendicularly to the plane of the frame 1 whether the same be horizontal or inclined, as in the drawings, with the teeth edge uppermost, and said band is supported upon a driving roller 12 and idle roller 13, said rollers being at different distances from the gripping conveyer, the driving roller 12 being located near the delivery end of the frame 1 and at a greater distance from the gripping conveyer, and the roller 13 being located near the receiving end of the frame 1 and nearer to the gripping conveyer, thus holding the stretched portions of the band 10 inclined to the direction of the movement of the gripping conveyer. Adjacent to one of the stretched portions of the said conveyer, I provide a stationarily mounted retaining and guiding device 14 which extends substantially parallel to the said stretched portion of the band 10, and has its lower edge a greater or less distance below the upper toothed edge of the band 10 so as to overlap the teeth thereof a greater or less extent. At its lower end the retaining device 14 is provided with an upwardly curved portion indicated at 15 which clears the teeth of the band, to permit the stalks carried by the gripping conveyer to readily enter between said teeth and the retaining guide 14, and the bottom edge of said guide is so constructed as to press the stalks or branches of the band downwardly into the bottoms of the recesses between the adjacent teeth 11. In order to hold the band 10 from lateral movement, it is preferably provided with a trough-shaped guide 16, as indicated in the drawings, which embraces the edge of the stripping band 10, which is not serrated, and holds it firmly against any lateral movement. The opposite portion of the stripping band 10 is provided with an inclosing guard, preferably U-shaped in cross section, indicated at 17, which extends over the toothed portion thereof, and prevents the stalks and branches from engaging the teeth of that portion of the guard which obviously moves in the opposite direction from the other stretched portions. The guard or guide 14, located adjacent to the toothed portions of the stripping band, may also be U-shaped and extend at both sides of the teeth, as shown at $14^a$ in Fig. 8, if desired, or it may extend only on one side thereof, as shown in the other figures.

The driving roller 12 will be operated by power, for example, by means of gearing 18 from the shaft of one of the driving rollers for the gripping conveyer, as shown, and preferably the stripping band is driven at slightly greater speed than the gripping conveyer, so that it not only does not retard the stalks from the receiving to the delivery end of the device, but runs ahead of the gripping conveyer to a greater or less extent. It will be readily understood that as the stalks and branches of the plants were made to engage the recesses between the teeth 11 of the stripping band, and are held against the possibility of becoming disengaged therefrom by the retaining device 14, that as the stripping band moves away from the gripping conveyer, the stripping band will be moved longitudinally of the stalks and branches toward their outer ends which carry the seed pods, and as the band moves slightly faster than the gripping conveyer, the stalks will be drawn into the lower angular portion of these recesses. To facilitate this effect, I prefer to so form the teeth 11 that each tooth will have an undercut forward face $11^a$ and an angular rear face $11^b$, the said undercut faces of the teeth tending to assist the pull on the stalks in forcing the stalks and branches down into the extreme angular portions of the recesses between the teeth, as will be readily understood. The portions of the angular recesses into which the stalks and branches are thus forced are very much smaller than the seed pods, one of which is indicated at 20 in Figs. 6 and 7, the base of the seed pod or terminal button, being indicated at 21, and a stalk or branch being indicated at 22. It will thus be seen that as the stripping band moves outwardly with respect to the stalks and branches, the seed pods will be brought into engagement with the inner face of the band, while the outer edge of the band at the bottom of the recesses will also engage the stalk at a short distance from the button, equal to the width of the stripping device, thus exerting a jerk which tends to break off the stalk or branch at a short distance from the seed pod or button, as will be clear from an examination of Fig. 6, and to facilitate this operation, I prefer to cut the recesses between the teeth 11 slightly deeper on the inner side of the stripping band than they are on the outer side, so as to form an acute angular cutting edge, indicated at 11ᶜ in Fig. 7, although this is not absolutely essential. In some cases if the seed pods are particularly dry, they will crack when brought into contact with the stripping band, shelling out the seed, but leaving the button 22 still attached to the stem, but even in such case, the engagement of the angular edge at the outer side of the stripping band with the stalk or branch a short distance below the button, will break off the stalk or branch at that point and free it from the objectionable button. Where the seed pods are still green, they offer good support for the end of the stalk or branch against the inner face of the stripping band so as to permit the stalk or branch to be readily broken a short distance below the seed pod.

The length of the stripping band and its angular position is such that by the time the plants reach the top or farther end of the frame 1, they will have been pulled entirely through the stripping band and freed from seed pods and buttons, all of which fall upon the inclined plate or bottom 3 of the frame, and are carried down into the trough 4. This trough may be provided with a worm 23 to convey the seed and pods to the outer end of the trough and into an elevator 24 which carries them upward and delivers them through a chute 25 into a bag or other receptacle. The seed pods, seed, and any particles of the plants which may be broken off may afterward be treated in any desired way for the recovery of the valuable flax seed for any desired purpose, while the stalks freed from said buttons and pods are delivered at the delivery end of the frame 1 and preferably upon the binding platform 25, provided with any of the well known forms of binding mechanism such, for example, as is used in self binding harvesters by means of which the cleaned stalks can be bound into bundles of the desired size and subsequently gathered and subjected to the necessary treatment for the recovery of the fiber.

What I claim and desire to secure by Letters Patent is:—

1. In an apparatus for removing seed and seed pods from grain stalks, the combination with means for gripping the stalks adjacent to the butt ends thereof, and holding them in substantially parallel relation, of cleaning blade provided with teeth having angularly disposed continuous faces, and means for moving said blade longitudinally in a direction at an angle to the stalks and away from the gripping and holding means.

2. In an apparatus for removing seed and seed pods from grain stalks, the combination with means for gripping the stalks adjacent to their butt ends and conveying them sidewise, of a cleaning device provided with teeth having angularly disposed contiguous faces, and means for moving said cleaning device longitudinally in a direction inclined to and away from the line of travel of said gripping and conveying means.

3. In an apparatus for removing seed and seed pods from grain stalks, the combination with means for gripping the stalks adjacent to their butt ends and conveying them sidewise, of a cleaning device provided with teeth having angularly disposed contiguous faces, retaining means for engaging said stalks adjacent to said cleaning device and holding the engaged portions of the stalks between the teeth of said cleaning device, and means for moving said blade longitudinally in a direction inclined to and away from the line of travel of said gripping and conveying means.

4. In an apparatus for removing seed and seed pods from grain stalks, the combination with means for gripping the stalks adjacent to their butt ends and conveying them sidewise, of a cleaning device provided with teeth having angularly disposed contiguous faces, a retaining guard having portions overlapping the outer extremities of said teeth for retaining the portions of said stalks within the recesses between said teeth, and means for moving said cleaning device longitudinally in a direction inclined to and away from the path of movement of said gripping and conveying means.

5. In an apparatus for removing seed and seed pods from grain stalks, the combination with means for gripping the stalks adjacent to their butt ends and conveying them sidewise, of a cleaning device provided with teeth having angularly disposed contiguous faces, a stationary retaining guard having portions parallel to said cleaning device and overlapping the outer extremities of said teeth for retaining the portions of said stalks within the recesses between the teeth, and means for moving said cleaning device longitudinally in a direction inclined to and away from the path of movement of said gripping and conveying means.

6. In an apparatus for removing seed and seed pods from grain stalks, the combination with means for gripping the stalks adjacent to their butt ends and conveying them sidewise, of an endless cleaning device provided throughout its length with teeth having angularly disposed contiguous faces, and having a portion of said endless device supported in position to engage said stalks, and lying in a direction inclined to the path of travel of said gripping and conveying means, and means for driving said endless cleaning device.

7. In an apparatus for removing seed and seed pods from grain stalks, the combination with means for gripping the stalks adjacent to their butt ends and conveying them sidewise, of an endless cleaning device provided throughout its length with teeth having angularly disposed contiguous faces, and having a portion of said endless device supported in position to engage said stalks, and lying in a direction inclined to the path of travel of said gripping and conveying means, a guard adapted to engage the stalks and hold them in the teeth of said endless cleaning device, and means for driving said endless cleaning device.

8. In an apparatus for removing the seed and seed pods from grain stalks, the combination with means for gripping the stalks adjacent to their butt ends and conveying them sidewise, of an endless cleaning device provided throughout its length with teeth having angularly disposed contiguous faces, and having a portion of said endless device supported in position to engage said stalks, and lying in a direction inclined to the path of travel of said gripping and conveying means, a stationary guard located adjacent to the portions of said cleaning device engaged by the stalks and overlapping the outer ends of the teeth of said device, for retaining the stalks in engagement therewith, and means for driving said endless cleaning device.

9. In an apparatus for removing seed and seed pods from grain stalks, the combination with means for gripping the stalks adjacent to their butt ends and conveying them sidewise, of an endless cleaning device provided throughout its length with teeth having angularly disposed contiguous faces, and having a portion of said endless device supported in position to engage said stalks, and lying in a direction inclined to the path of travel of said gripping and conveying means, a protecting guard for inclosing the teeth of other portions of said endless cleaning device to prevent them from coming into contact with the stalks, and means for driving said endless cleaning device.

10. In an apparatus for removing seed and seed pods from grain stalks, the combination with means for gripping the stalks adjacent to their butt ends and conveying them sidewise, of an endless cleaning device provided throughout its length with teeth having angularly disposed contiguous faces, and having a portion of said endless device supported in position to engage said stalks, and lying in a direction inclined to the path of travel of said gripping and conveying means, a stationary guard located adjacent to portions of said cleaning device engaged by the stalks and overlapping the outer ends of the teeth of said device, for retaining the stalks in engagement therewith, a protecting guard for inclosing the teeth of other portions of said endless cleaning device, to prevent them from coming into contact with the stalks, and means for driving said endless cleaning device.

11. The combination with endless gripping and conveying mechanism, adapted to grip the stalks adjacent to their butt ends and carry them sidewise, of an endless metallic cleaning band provided along one edge with vertically disposed teeth, a portion of said band being supported in a position inclined to the stalks and angularly to the direction of travel of the gripping and conveying mechanism, a stationary guard located adjacent to said portion of said band having portions overlapping the extremities of the teeth thereof, for holding the stalks in the recesses between said teeth and a guard for covering the teeth of the other portions of said band to prevent the engagement of the stalks therewith, and means for driving said band.

12. In an apparatus for removing seed and seed pods from grain stalks, the combination with means for gripping the stalks adjacent to their butt ends and conveying them sidewise, of a cleaning device provided with teeth having angularly disposed contiguous faces, and means for moving said cleaning device longitudinally in a direction inclined to and away from the line of travel of said gripping and conveying means, and at greater speed than said gripping and conveying means.

13. The combination with endless gripping and conveying mechanism, adapted to grip the stalks adjacent to their butt ends and carry them sidewise, of an endless metallic cleaning band provided along one edge with vertically disposed teeth, a portion of said band being supported in a position inclined to the stalks and angularly to the direction of travel of the gripping and conveying mechanism, a stationary guard located adjacent to said portion of said band having portions overlapping the extremities of the teeth thereof, for holding the stalks in the recesses between said teeth, and a guard for covering the teeth of the other portions of said band, to prevent the engagement of the stalks therewith, and means for driving said band at greater speed than the gripping and conveying mechanism, whereby the stalks will be broken a short distance from the point of connection of the said butts thereof.

14. The combination with endless gripping and conveying mechanism, adapted to grip the stalks adjacent to their butt ends and carry them sidewise, of an endless metallic cleaning band provided along one edge with vertically disposed teeth, a portion of said band being supported in a position inclined to the stalks and angularly to the direction of travel of the gripping and conveying mechanism, a stationary guard located adjacent to said portion of said band having portions overlapping the extremities of the teeth thereof, for holding the stalks in the recesses between said teeth, and a guard for covering the teeth of the other portions of said band, the recess between the teeth of said band being deeper on the side thereof which is farther from the gripping and conveying mechanism, whereby sharp edges are formed to sever the stalks and branches at a little distance from the points of connection of the seed pods thereof, and means for driving said endless bands.

15. The combination with endless gripping and conveying mechanism, adapted to grip the stalks adjacent to their butt ends and carry them sidewise, of an endless metallic cleaning band provided along one edge with vertically disposed teeth, a portion of said band being supported in a position inclined to the stalks and angularly to the direction of travel of the gripping and conveying mechanism, a stationary guard located adjacent to said portion of said band having portions overlapping the extremities of the teeth thereof, for holding the stalks in the recesses between said teeth, and a guard for covering the teeth of the other portions of said band, the recess between the teeth of said band being deeper on the side thereof which is farther from the gripping and conveying mechanism, whereby sharp edges are formed to sever the stalks and branches at a little distance from the points of connection of the seed pods thereof, and means for driving said band at a greater speed than the gripping and conveying mechanism, whereby the stalks will be broken a short distance from the point of connection of the said pods thereof.

In testimony whereof I affix my signature.

THEODORE KREIPE.

Copies of this patent may be obtained for five cents each, by addressing the "Commissioner of Patents, Washington, D. C."